(12) United States Patent
Takayama et al.

(10) Patent No.: US 8,681,913 B2
(45) Date of Patent: Mar. 25, 2014

(54) RECEPTION CIRCUIT

(75) Inventors: Naohisa Takayama, Tokyo (JP); Ryoji Hayashi, Tokyo (JP); Hiroyuki Joba, Tokyo (JP); Morishige Hieda, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 145 days.

(21) Appl. No.: 13/295,052

(22) Filed: Nov. 12, 2011

(65) Prior Publication Data

US 2012/0128106 A1 May 24, 2012

(30) Foreign Application Priority Data

Nov. 19, 2010 (JP) ................................ 2010-258614

(51) Int. Cl.
*H03D 1/00* (2006.01)
(52) U.S. Cl.
USPC ............................. 375/343; 375/316; 375/340
(58) Field of Classification Search
USPC .......................................... 375/343, 316, 340
See application file for complete search history.

(56) References Cited

U.S. PATENT DOCUMENTS

| 6,016,329 | A | 1/2000 | Iwasaki | |
|---|---|---|---|---|
| 2003/0151547 | A1* | 8/2003 | Mauro et al. | 342/357.15 |
| 2008/0107191 | A1* | 5/2008 | Ishii | 375/260 |
| 2008/0198836 | A1* | 8/2008 | Sun | 370/350 |
| 2009/0135977 | A1* | 5/2009 | Sheu | 375/371 |

FOREIGN PATENT DOCUMENTS

| JP | 10-155004 A | 6/1998 |
|---|---|---|
| JP | 3185716 B2 | 7/2001 |

* cited by examiner

*Primary Examiner* — Leila Malek
(74) *Attorney, Agent, or Firm* — Miles & Stockbridge P.C.

(57) ABSTRACT

A reception circuit is provided which can detect the beginning of data regardless of a preamble or a unique word contained or not in a received signal and regardless of coding systems for received signals. The reception circuit includes a correlation operation portion that performs a correlation operation to generate a correlation signal while sliding one symbol of reference signal in relation to a received signal. The reference signal goes to a high level during a first half symbol period and goes to a low level during a second half symbol period. The reception circuit further includes: a delay portion that outputs a delay signal by delaying the received signal for a half symbol period in relation to the received signal; and a data beginning timing detection portion that detects a beginning peak timing for the correlation signal as a beginning timing of data contained in the delay signal.

6 Claims, 10 Drawing Sheets

RECEPTION CIRCUIT

CROSS-REFERENCE TO RELATED APPLICATIONS

The disclosure of Japanese Patent Application No. 2010-258614 filed on Nov. 19, 2010 including the specification, drawings and abstract is incorporated herein by reference in its entirety.

BACKGROUND

The present invention relates to a reception circuit.

A reception circuit according to related art detects the beginning of data as a preliminary to a stage that performs bit discrimination on a received signal and demodulates the data. The circuit performs correlation operation on a received signal using a specific pattern including a unique word as a reference signal and detects a peak value as the beginning of data. For example, refer to patent document 1 (Japanese Unexamined Patent Application No. 10 (1998)-155004) and patent document 2 (Japanese Patent No. 3185716).

Figure 10:
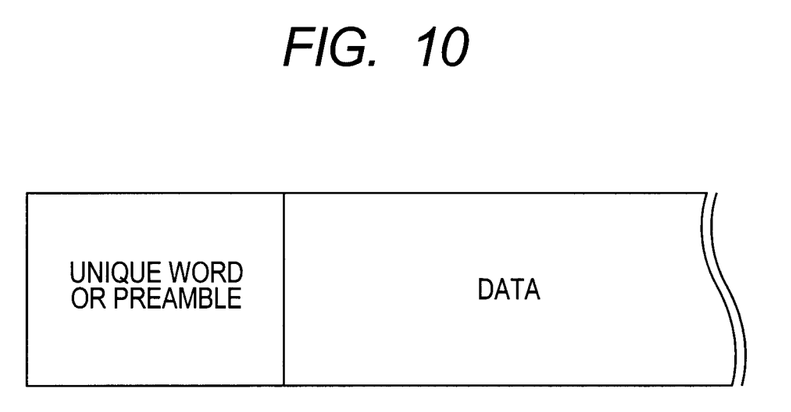
FIG. 10 illustrates a configuration of data containing a preamble or a unique word.

As shown in FIG. 10, the data beginning detection system premises that a received signal contains a unique word or a preamble prefixed to data. The system performs a correlation operation on the received signal using unique words in a delay unique word table as a reference signal and detects a peak value output from a correlator as the beginning of data.

Patent Document 1: Japanese Unexamined Patent Application No. 10 (1998)-155004
Patent Document 2: Japanese Patent No. 3185716

SUMMARY

However, for example, the data beginning detection system used for reception circuits according to related art as disclosed in patent documents 1 and 2 does not contain the preamble and the unique word used for card mode signals compliant with ISO/IEC14443 TypeA or TypeB and is incompatible with a received signal that uses a modulation signal as data itself.

The data beginning detection system used for reception circuits according to related art as disclosed in patent documents 1 and 2 uses specific unique words. Therefore, the system can detect the beginning of data for received signals according to a specific code system but cannot detect the beginning of data for received signals according to other code systems.

It is therefore an object of the invention to provide a reception circuit capable of detecting the beginning of data regardless of a preamble or a unique word contained or not in a received signal and regardless of coding systems for received signals.

A reception circuit according to an embodiment of the invention includes a correlation operation portion that performs a correlation operation to generate a correlation signal while sliding one symbol of reference signal in relation to a received signal. The reference signal goes to a high level during a first half symbol period and goes to a low level during a second half symbol period. The reception circuit further includes: a delay portion that outputs a delay signal by delaying the received signal for a half symbol period in relation to the received signal; and a detection portion that detects a beginning peak timing for the correlation signal as a beginning timing of data contained in the delay signal.

A reception circuit according to an embodiment of the invention can detect the beginning of data regardless of a preamble or a unique word contained or not in a received signal and regardless of coding systems for received signals.

DETAILED DESCRIPTION

Embodiments of the present invention will be described with reference to the accompanying drawings.

First Embodiment (Configuration)

Figure 1:
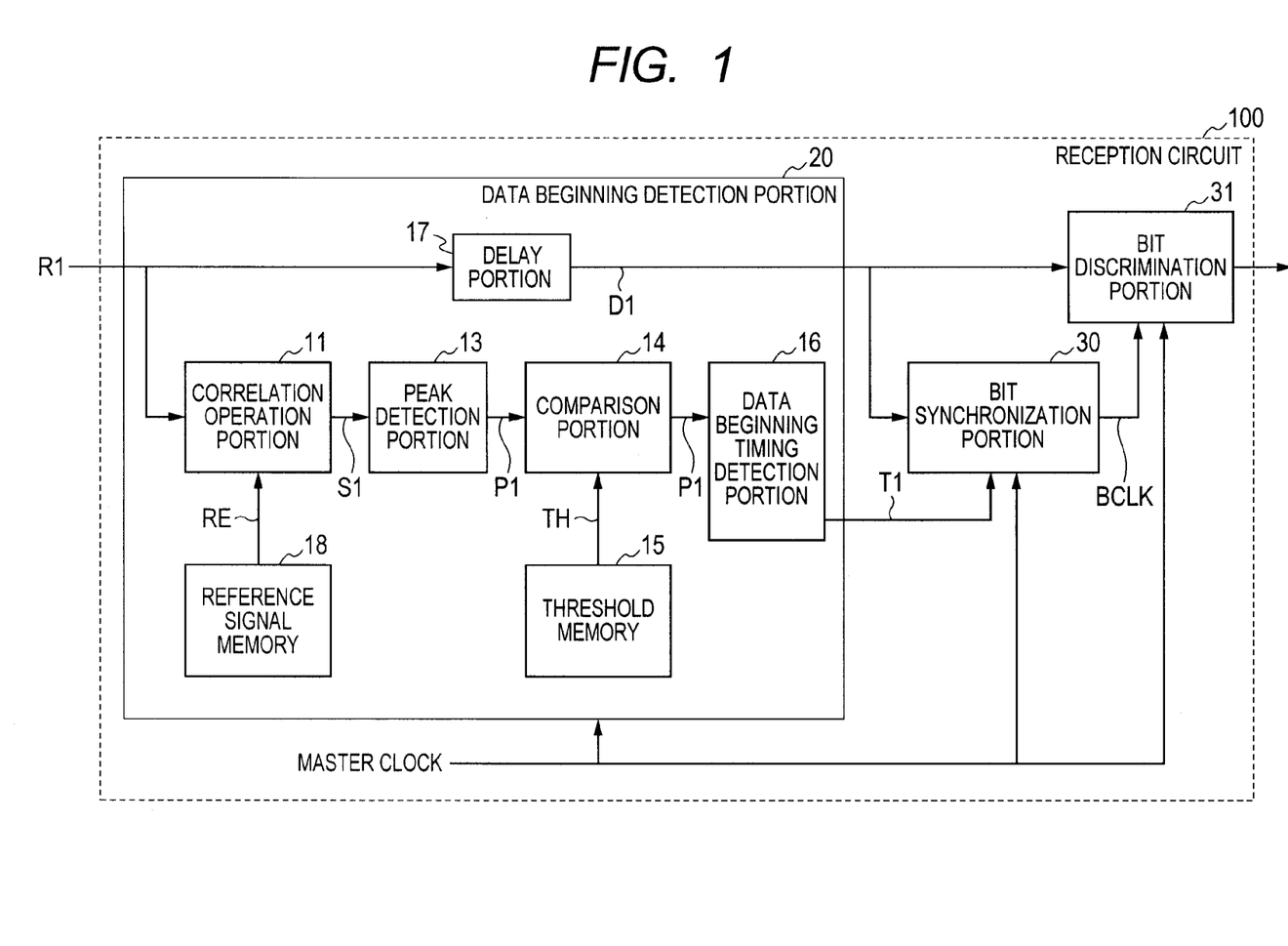
FIG. 1 shows a configuration of a reception circuit according to a first embodiment.

FIG. 1 shows a configuration of a reception circuit according to the first embodiment.

The reception circuit includes a correlation operation portion, a reference signal memory, a peak detection portion, a determination portion, a threshold memory, a data beginning timing detection portion, a delay portion, a data beginning detection portion, a bit synchronization portion, and a bit discrimination portion.

The reference signal memory stores one symbol of reference signal RE. The reference signal RE goes to the "H" level during the first half symbol and goes to the "L" level during the second half symbol. The half symbol period allows the "H" level and the "L" level to continue and is shorter than the length of an "H" level and an "L" level for a received signal at the highest transmission rate available in the communication system, that is, shorter than the shortest "H" or "L" level in the communication system.

The threshold memory stores a threshold value TH.

(Correlation Operation)

The correlation operation portion 11 performs a correlation operation to generate a correlation signal S1 while sliding one symbol of the reference signal RE with reference to a received signal A.

When a sampling sequence for the received signal A contains values $a_0, a_1, a_2$, and so on, a sampling sequence for the reference signal RE contains values $f_0, f_1, f_2, \ldots,$ and $f_N$, and a sampling sequence for the correlation signal S1 contains values $b_0, b_1, b_2$, and so on, equations (A1) and (A2) express sampling values $b_{n-1}$ and $b_n$ of the correlation signal S1 at the (n−1)th time point and the nth time point as follows, for example.

[Equation 1]

$$b_n = \sum_{i=0}^{N-1} a_{n-N+1+i} \times f_i \quad (A1)$$

$$b_{n-1} = \sum_{i=0}^{N-1} a_{n-N+i} \times f_i \quad (A2)$$

Correlation Operation Example

Figure 2:
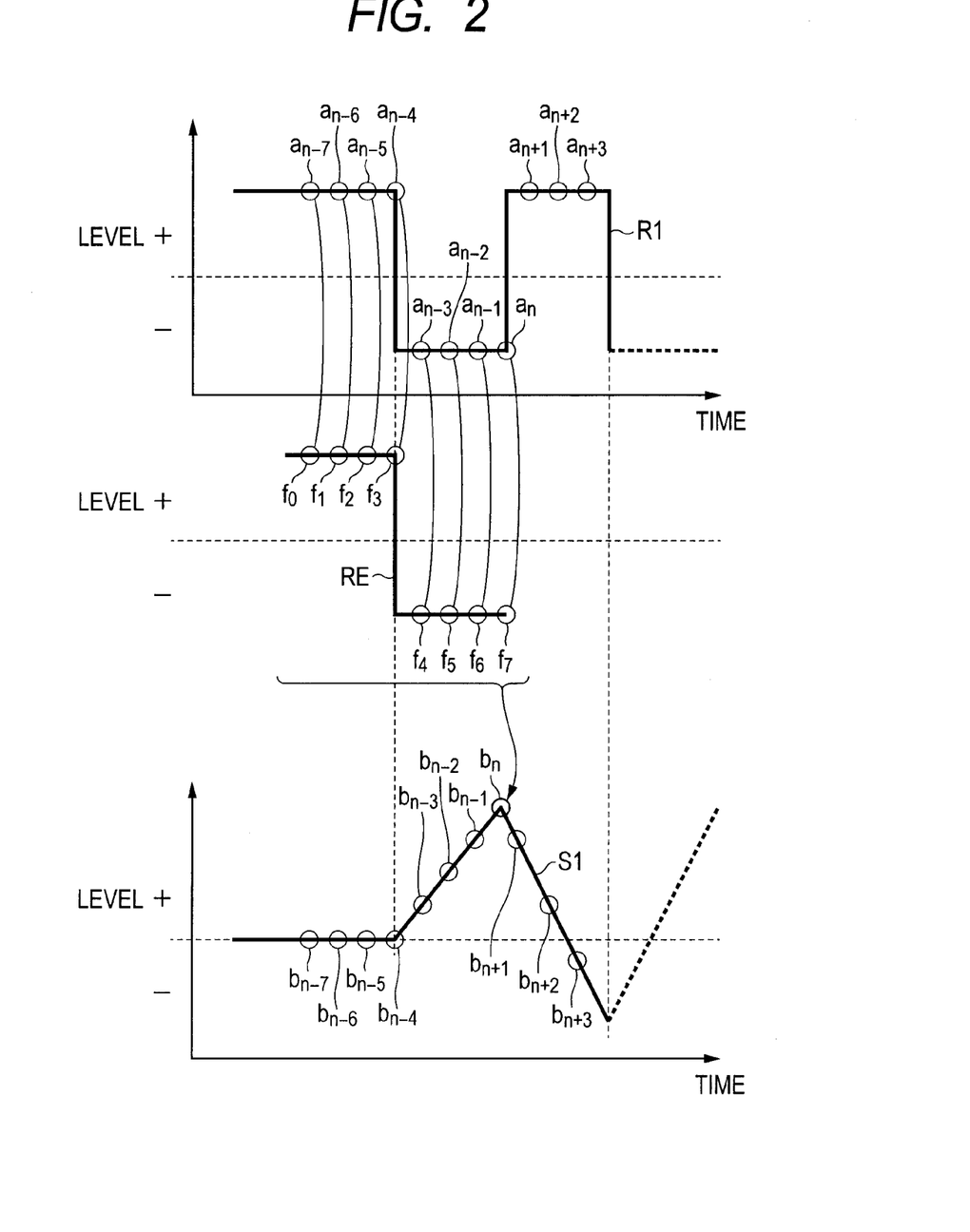
FIG. 2 illustrates a method of calculating sampling value $b_n$ for a correlation signal S1.

FIG. 2 illustrates a method of calculating sampling value $b_n$ for the correlation signal S1.

When the sampling sequence for the reference signal RE contains $f_0$ through $f_7$, the following equation calculates sampling value $b_n$ of the correlation signal S1.

$$b_n = f_0 \times a_{n-7} + f_1 \times a_{n-6} + f_2 \times a_{n-5} + f_3 \times a_{n-4} + f_4 \times a_{n-3} + f_5 \times a_{n-2} + f_6 \times a_{n-1} + f_7 \times a_n \quad (A3)$$

Figure 3:
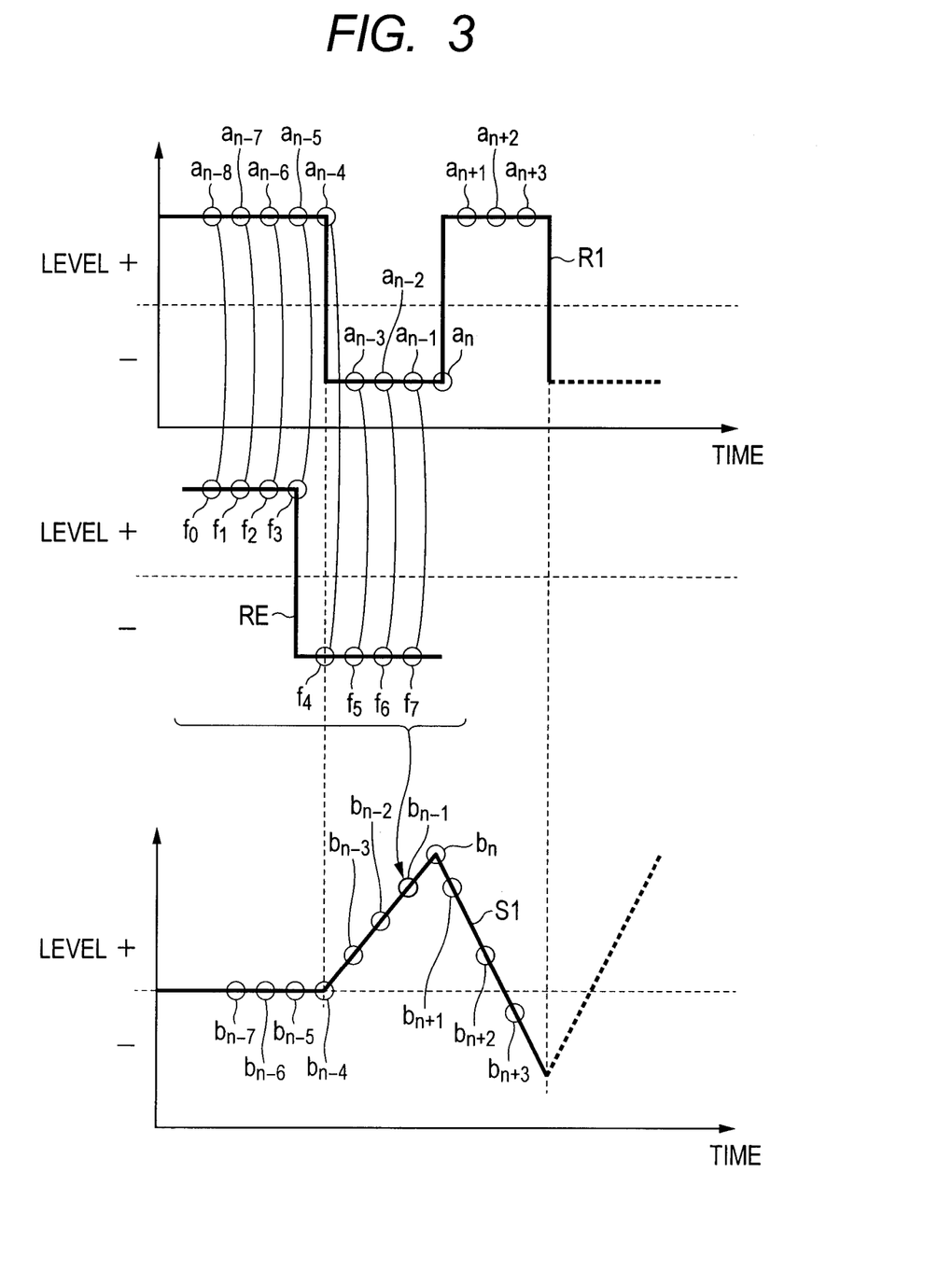
FIG. 3 illustrates a method of calculating sampling value $b_{n-1}$ for the correlation signal S1.

FIG. 3 illustrates a method of calculating sampling value $b_{n-1}$ for the correlation signal S1.

When the sampling sequence for the reference signal RE contains $f_0$ through $f_7$, the following equation calculates sampling value $b_{n-1}$ of the correlation signal S1.

$$b_{n-1} = f_0 \times a_{n-8} + f_1 \times a_{n-7} + f_2 \times a_{n-6} + f_3 \times a_{n-5} + f_4 \times a_{n-4} + f_5 \times a_{n-3} + f_6 \times a_{n-2} + f_7 \times a_{n-1} \quad (A4)$$

As can be seen from comparison between FIG. 2 and FIG. 3, the correlation operation is performed while sliding the reference signal RE. The value of the correlation signal S1 increases when the reference signal RE matches the pattern of the received signal R1.

Now returning back to FIG. 1, the peak detection portion 13 generates a peak signal P1 representing the peak of the correlation signal S1.

A comparison portion 14 outputs the peak signal P1 to the data beginning timing detection portion if a peak value of the peak signal P1 exceeds the threshold value TH.

The delay portion 17 delays the received signal R1 by a half symbol period of the reference signal to output a delay signal D1.

The data beginning timing detection portion 16 detects the timing of a beginning peak 45 contained in the peak signal P1 as timing T1 at the beginning of data contained in the delay signal D1.

The bit synchronization portion 30 outputs bit timing clock BCLK based on the detected beginning timing.

The bit discrimination portion 31 synchronizes with the bit timing clock BCLK, performs bit discrimination on data contained in the delay signal D1 as an output signal from the data beginning detection portion 20, and demodulates the signal to data.

(Operations)

The following describes operations of the reception circuit shown in FIG. 1.

Figure 4:
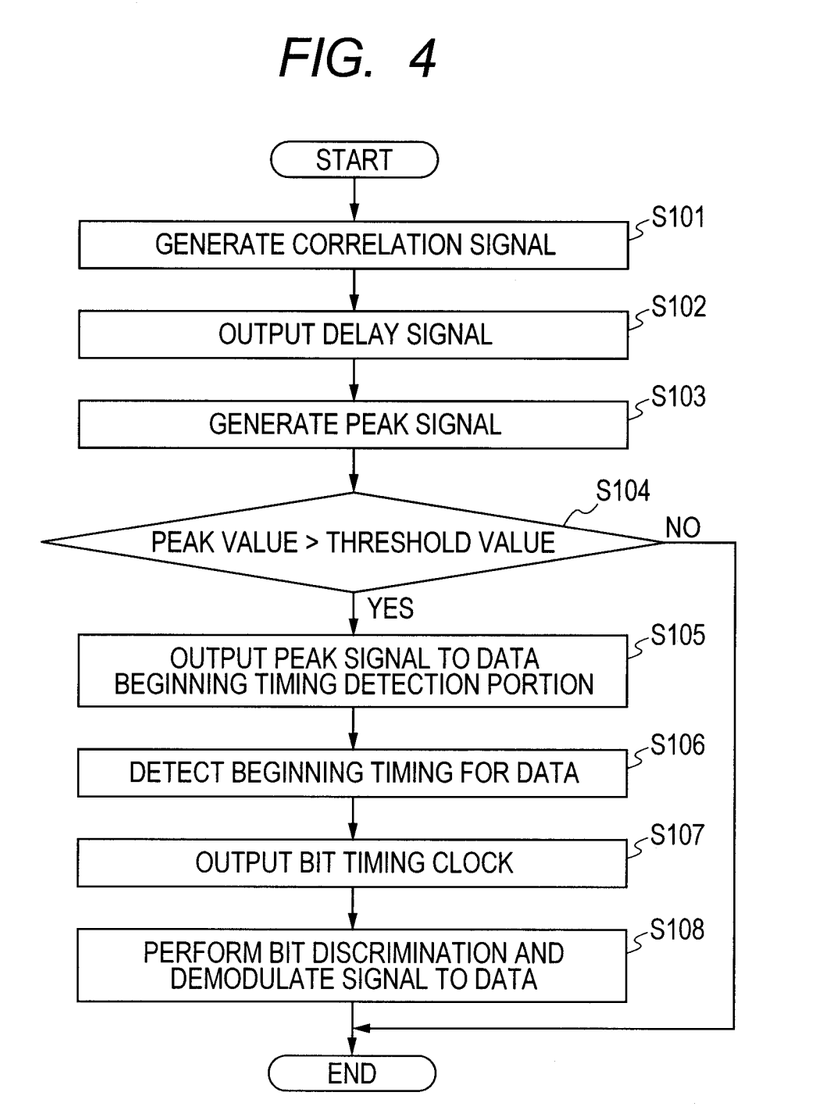
FIG. 4 is a flowchart showing operations of the reception circuit shown in FIG. 1.

FIG. 4 is a flowchart showing operations of the reception circuit shown in FIG. 1.

Figure 5:
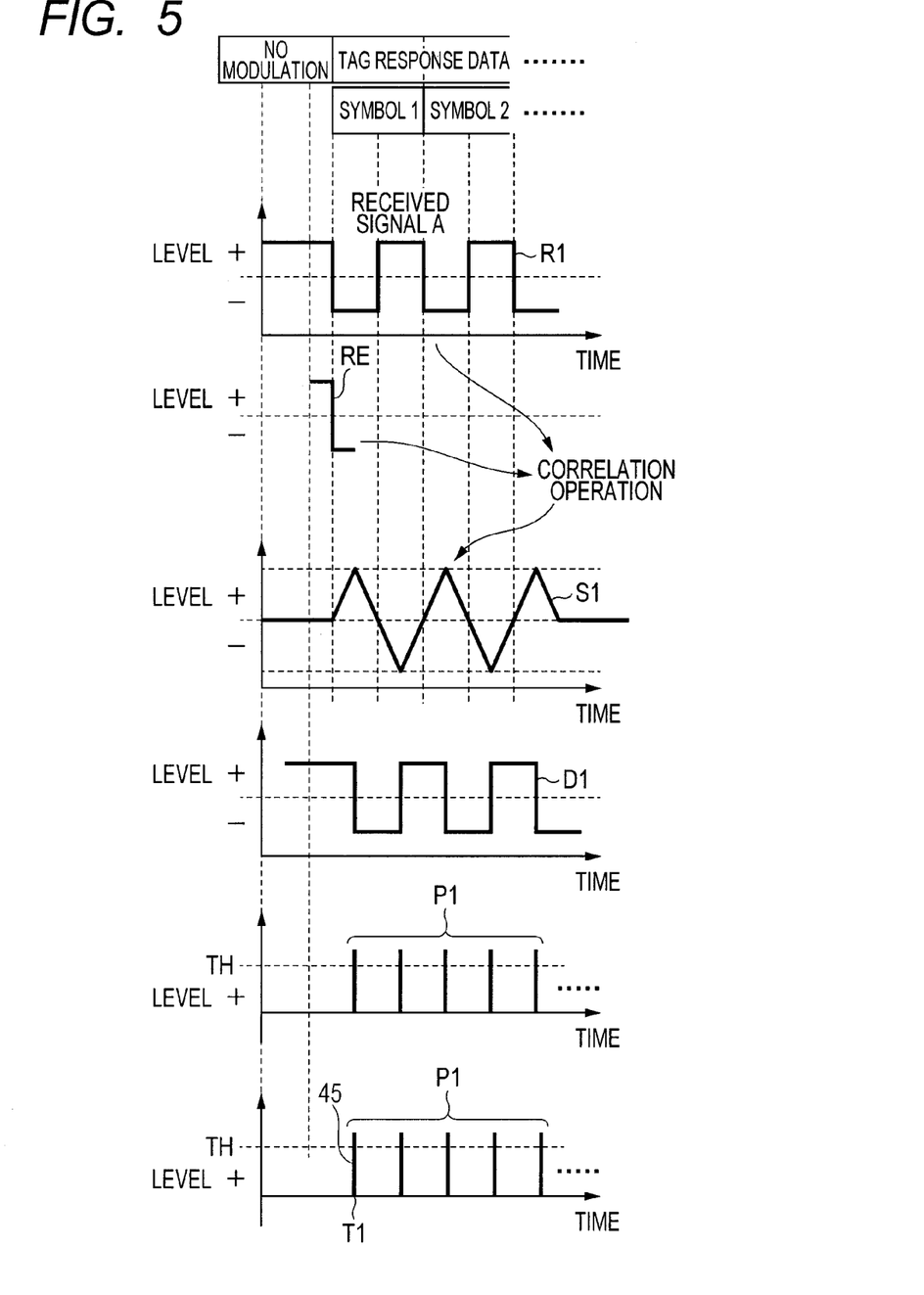
FIG. 5 is a timing chart when a received signal A is input to the reception circuit shown in FIG. 1.

FIG. 5 provides a timing chart when the received signal A is input to the reception circuit shown in FIG. 1. In terms of mode, the received signal A is coded with the Manchester code compliant with the FeliCa specification. As shown in FIG. 10, the received signal A contains a preamble or a unique word prefixed to data.

Figure 6:
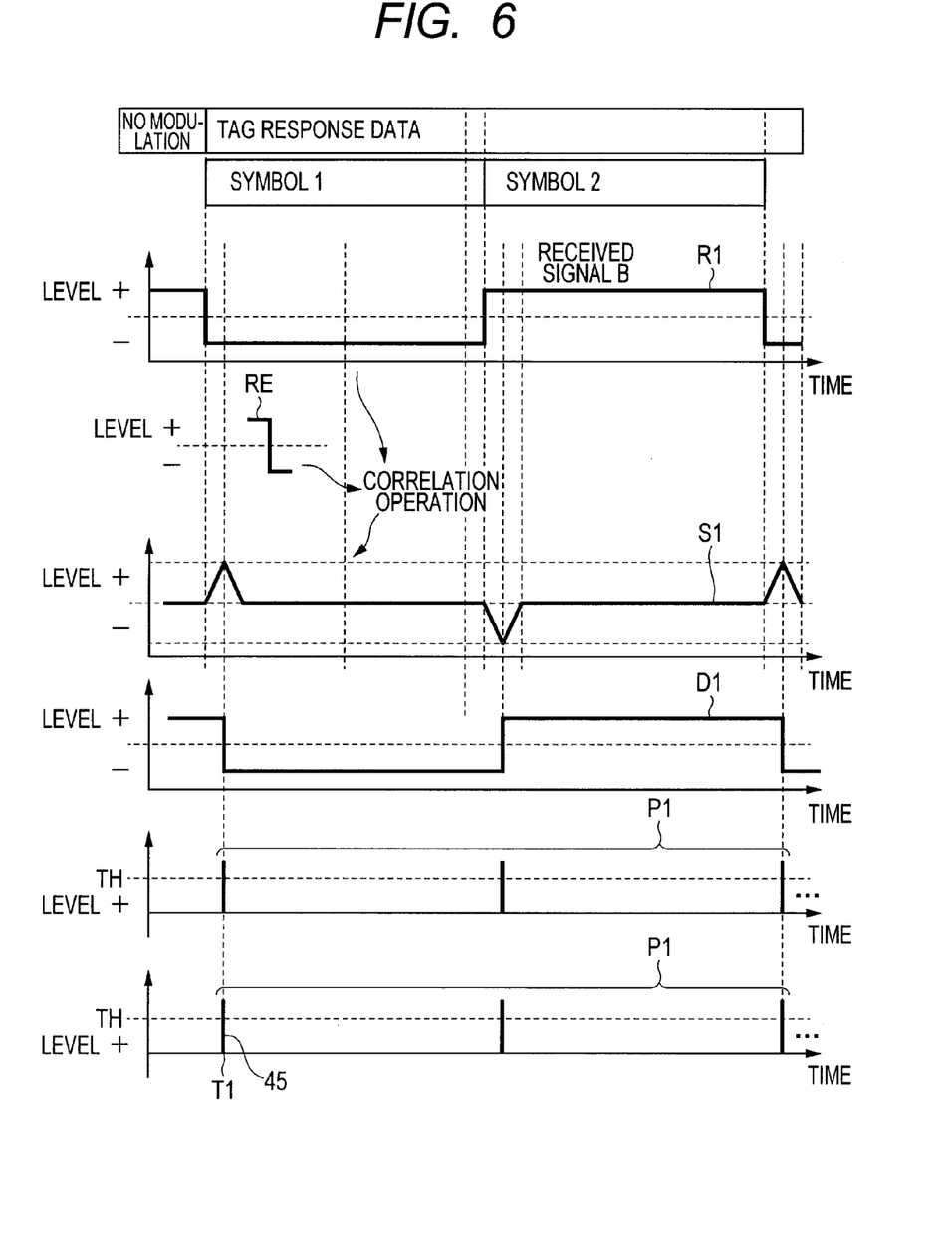
FIG. 6 is a timing chart when a received signal B is input to the reception circuit shown in FIG. 1.

FIG. 6 is a timing chart when a received signal B is input to the reception circuit shown in FIG. 1. The received signal B is coded with the NRZ (Non-Return-to-Zero) code compliant with ISO/IEC 14443-2 TypeB. The received signal B contains neither preamble nor unique word.

With reference to FIGS. 4, 5, and 6, the correlation operation portion 11 in the data beginning detection portion 20 performs a correlation operation to generate the correlation signal S1 while sliding one symbol of the reference signal RE in relation to the received signal R1 (step S101).

The delay portion 17 in the data beginning detection portion 20 delays the received signal R1 by a half symbol period for the reference signal to output the delay signal D1 (step S102).

The peak detection portion 13 in the data beginning detection portion 20 generates the peak signal P1 representing the correlation signal S1 (step S103).

The comparison portion 14 in the data beginning detection portion 20 determines whether a peak value of the peak signal P1 exceeds the threshold value TH. If the peak value of the peak signal P1 exceeds the threshold value TH (YES at step S104), the comparison portion 14 outputs the peak signal P1 to the data beginning timing detection portion (step S105).

The data beginning timing detection portion 16 in the data beginning detection portion 20 detects timing of the beginning peak 45 contained in the peak signal P1 as the beginning timing T1 for data contained in the delay signal D1 (step S106).

The bit synchronization portion 30 outputs the bit timing clock BCLK based on the detected beginning timing (step S107).

The bit discrimination portion 31 synchronizes with the bit timing clock BCLK, performs bit discrimination on data contained in the delay signal D1 as an output signal from the data beginning detection portion 20, and demodulates the signal to data (step S108).

(Effect)

As described above, the embodiment can fast detect the beginning of data in a received signal that contains only data itself without a preamble. In addition, the embodiment can fast detect the beginning of data in received signals associated with various types of modes.

Second Embodiment

Figure 7:
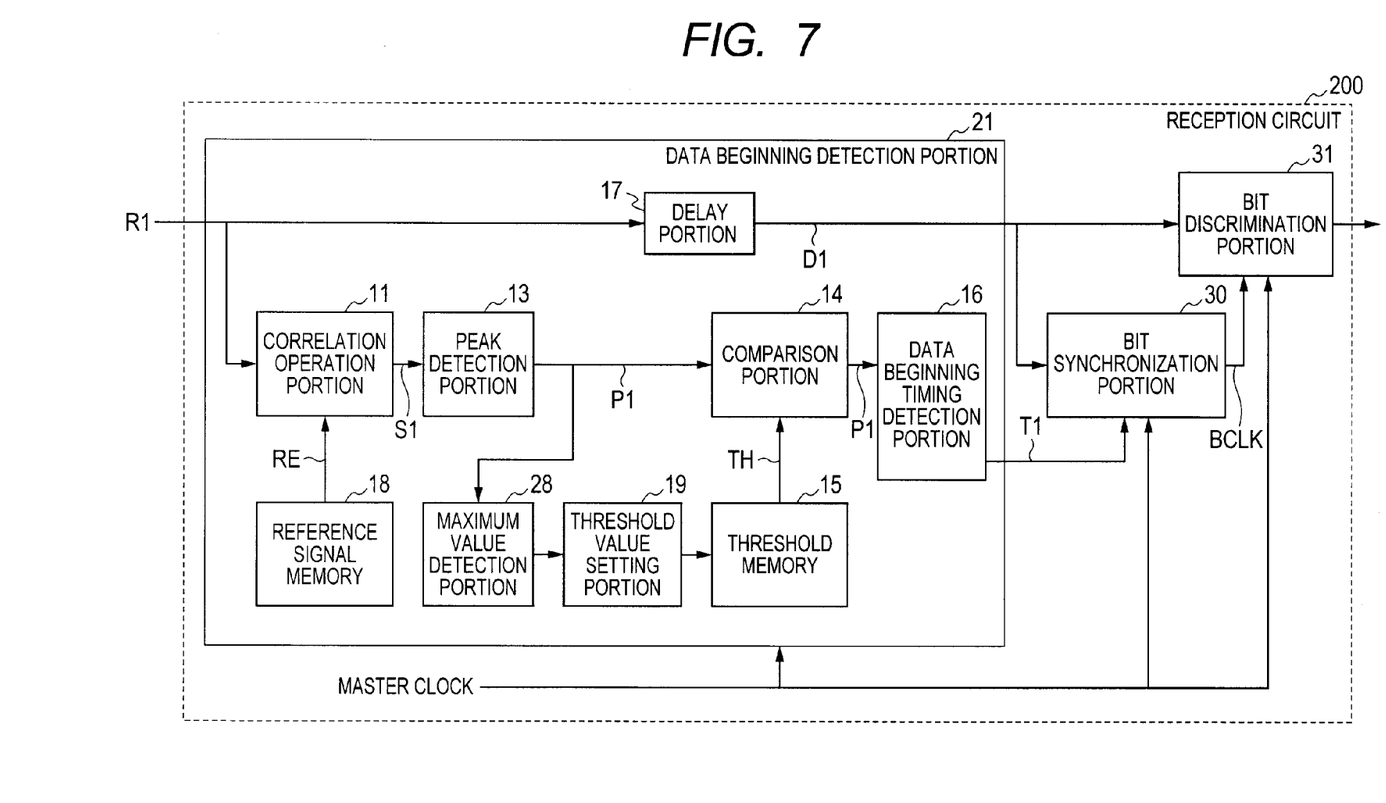
FIG. 7 shows a configuration of a reception circuit according to a second embodiment.

FIG. 7 shows a configuration of a reception circuit according to the second embodiment.

A difference from the reception circuit 100 in FIG. 1 is that a reception circuit 200 in FIG. 7 includes a maximum value detection portion 28 and a threshold value setting portion 19. The other configurations are equal to those in FIG. 1 and a description is omitted for simplicity.

The maximum value detection portion 28 detects the maximum peak value for the peak signal P1 during a period predetermined in the system, e.g., a specified period PT immediately after transition from transmission mode to reception mode.

The threshold value setting portion 19 multiplies the maximum peak value detected in the maximum value detection portion by coefficient K (a value set to 1 or more) to settle the threshold value TH1 and saves it in the threshold memory.

(Operations)

The following describes operations of the reception circuit shown in FIG. 7.

Figure 8:
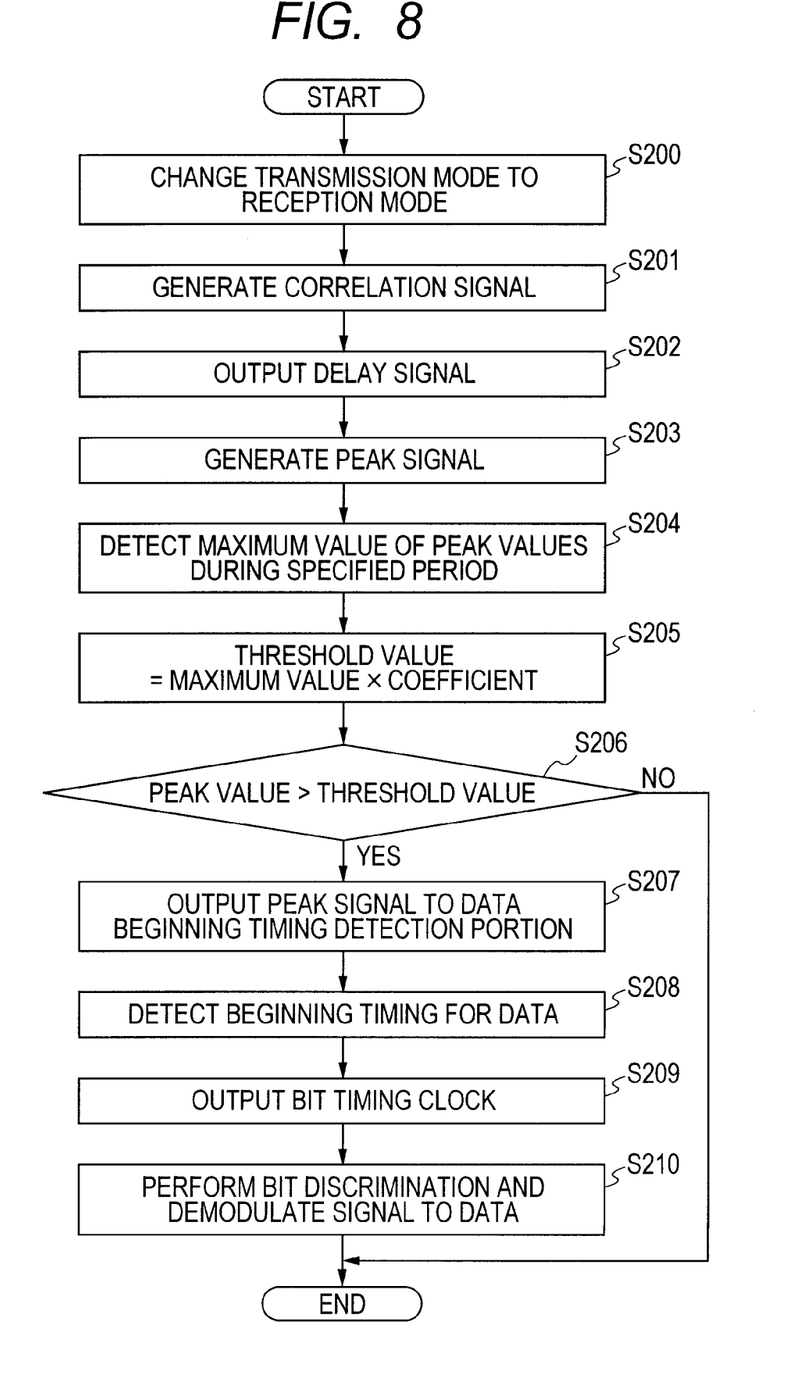
FIG. 8 is a flowchart showing operations of the reception circuit shown in FIG. 7.

FIG. 8 is a flowchart showing operations of the reception circuit shown in FIG. 7.

Figure 9:
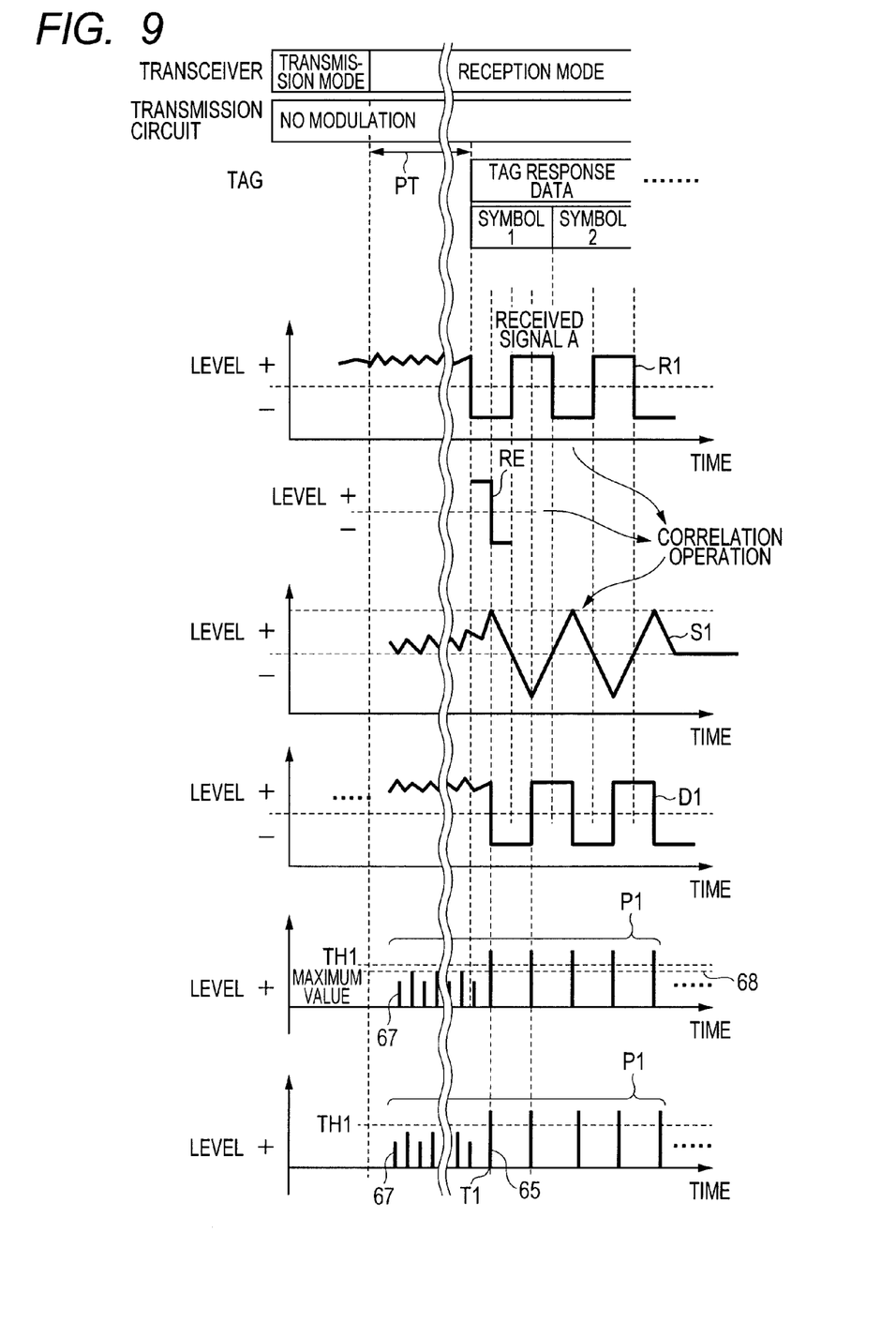
FIG. 9 is a timing chart when the received signal A is input to the reception circuit shown in FIG. 7.

FIG. 9 is a timing chart when the received signal A is input to the reception circuit shown in FIG. 7. In terms of mode, the received signal A is coded with the Manchester code compliant with the FeliCa specification. As shown in FIG. 10, the received signal A contains a preamble or a unique word prefixed to data.

Transmission mode is changed to reception mode (step S200).

The correlation operation portion 11 in the data beginning detection portion 20 performs a correlation operation to generate the correlation signal S1 while sliding one symbol of the reference signal RE in relation to received signal R1 (step S201).

The delay portion 17 in the data beginning detection portion 20 delays the received signal R1 by a half symbol period for the reference signal to output the delay signal D1 (step S202).

The peak detection portion 13 in the data beginning detection portion 20 generates the peak signal P1 representing the correlation signal S1 (step S203).

The maximum value detection portion 28 in the data beginning detection portion 20 detects a maximum value 68 of peak values 67 for the peak signal P1 during a period predetermined in the system, e.g., the specified period PT immediately after transition from transmission mode to reception mode (step S204).

The threshold value setting portion 19 in the data beginning detection portion 20 multiplies the maximum value 68 by coefficient K (a value set to 1 or more) to settle the threshold value TH1 (step S205).

The comparison portion 14 in the data beginning detection portion 20 determines whether the peak value for the peak signal P1 exceeds the threshold value TH1 after a lapse of the specified period PT immediately after transition from transmission mode to reception mode. If the peak value for the peak signal P1 exceeds the threshold value TH1 (YES at step S206), the comparison portion 14 outputs the peak signal P1 to the data beginning timing detection portion (step S207).

The data beginning timing detection portion 16 in the data beginning detection portion 20 detects timing of a beginning peak 65 contained in the peak signal P1 as the beginning timing T1 for data contained in the delay signal D1 (step S208).

The bit synchronization portion 30 outputs the bit timing clock BCLK based on the detected beginning timing (step S209).

The bit discrimination portion 31 synchronizes with the bit timing clock BCLK, performs bit discrimination on data contained in the delay signal D1 as an output signal from the data beginning detection portion 20, and demodulates the signal to data (step S210).

(Effect)

Similarly to the first embodiment, the second embodiment can detect, in a short time, the beginning of data in a received signal that contains only data itself without a preamble. In addition, the second embodiment can detect, in a short time, the beginning of data in received signals associated with various types of modes. Further, the second embodiment can appropriately configure a threshold value to be compared with the correlation signal peak because the beginning timing of data is detected in accordance with a received signal.

(Modification)

The present invention is not limited to the above-mentioned embodiments and includes the following modification.

(1) Reference Signal

When the reference signal has an N-bit length, the reference signal may go to the "H" level during the first N/2-bit period and may go to the "L" level during the second N/2-bit period.

All the disclosed embodiments just provide examples and must be considered to be nonrestrictive. Accordingly, various modifications may be made without departing from the spirit or scope of the general inventive concept as defined by the appended claims and their equivalents.

What is claimed is:

1. A reception circuit comprising:
   a correlation operation portion that performs a correlation operation to generate a correlation signal while sliding one symbol of reference signal in relation to a received signal, the reference signal being in a high level during a first half symbol period and being in a low level during a second half symbol period;
   a delay portion that outputs a delay signal by delaying the received signal for a half symbol period of the reference signal in relation to the received signal; and
   a detection portion that detects a beginning peak timing for the correlation signal as a beginning timing of data contained in the delay signal.

2. The reception circuit according to claim 1,
   wherein the detection portion detects the beginning timing when a peak value for the correlation signal exceeds a threshold value.

3. The reception circuit according to claim 2, comprising:
   a maximum value detection portion that detects a maximum value for the correlation signal during a specified period; and
   a threshold value setting portion that sets the threshold value based on the maximum value.

4. The reception circuit according to claim 3,
   wherein the threshold value setting portion sets the threshold value by multiplying the maximum value and a coefficient together.

5. The reception circuit according to claim 3,
   wherein the specified period is a period immediately after transmission mode changes to reception mode.

6. The reception circuit according to claim 1, further comprising:
   a bit synchronization portion that outputs a bit timing clock based on the detected beginning timing; and
   a bit discrimination portion that synchronizes with the bit timing clock and discriminates a bit in data contained in the delay signal.

* * * * *